United States Patent
Durand (10) Patent No.: US 7,529,375 B2
(45) Date of Patent: May 5, 2009

(54) METHOD FOR PROCESSING ENCRYPTED DATA FOR FIRST DOMAIN RECEIVED IN A NETWORK PERTAINING TO A SECOND DOMAIN

(75) Inventor: Alain Durand, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 102 days.

(21) Appl. No.: 10/505,390

(22) PCT Filed: Feb. 21, 2003

(86) PCT No.: PCT/FR03/00583

§ 371 (c)(1),
(2), (4) Date: Aug. 20, 2004

(87) PCT Pub. No.: WO03/073761

PCT Pub. Date: Sep. 4, 2003

(65) Prior Publication Data

US 2005/0084109 A1    Apr. 21, 2005

(30) Foreign Application Priority Data

Feb. 25, 2002    (FR) .................................. 02 02330

(51) Int. Cl.
*H04L 9/00* (2006.01)
(52) U.S. Cl. ...................... 380/277; 713/153
(58) Field of Classification Search ............... 380/261, 380/259, 277; 713/193, 153
See application file for complete search history.

(56) References Cited

U.S. PATENT DOCUMENTS

| | | | | |
|---|---|---|---|---|
| 5,481,613 A | * | 1/1996 | Ford et al. | 380/30 |
| 5,642,419 A | * | 6/1997 | Rosen | 705/76 |
| 6,192,130 B1 | * | 2/2001 | Otway | 380/277 |

FOREIGN PATENT DOCUMENTS

| | | |
|---|---|---|
| EP | 0858184 | 8/1998 |
| WO | WO 00/56068 | 9/2000 |
| WO | WO 00/62505 | 10/2000 |

OTHER PUBLICATIONS

Search Report Dated Jul. 1, 2003.

* cited by examiner

*Primary Examiner*—Gilberto Barron, Jr.
*Assistant Examiner*—Devin Almeida
(74) *Attorney, Agent, or Firm*—Robert D. Shedd; Joseph J. Opalach; Catherine A. Ferguson (57) ABSTRACT

A method of processing data, encrypted according to an encryption method specific to a first domain, in which such data cannot be decrypted without the aid of a first secret specific to the first domain The data is received in a presentation device connected to a network belonging to a second domain. The method comprises the steps of:
(a) transmitting at least a portion of said encrypted data to a processing device connected to the network and;
(b) receiving from said processing device at least one element being used to decrypt said received data with the aid of a second secret specific to the second domain, the second secret being contained in the presentation device.

5 Claims, 4 Drawing Sheets

METHOD FOR PROCESSING ENCRYPTED DATA FOR FIRST DOMAIN RECEIVED IN A NETWORK PERTAINING TO A SECOND DOMAIN

This application claims the benefit, under 35 U.S.C. § 365 of International Application PCT/FR03/00583, filed Feb. 21, 2003, which was published in accordance with PCT Article 21(2) on Sep. 4, 2003 in French and which claims the benefit of French patent application No. 0202330, filed Feb. 25, 2002.

SCOPE OF THE INVENTION

The present invention relates to the field of protection against copying digital data and against illegal access to such data, in particular when the data is circulating in local digital networks such as digital domestic networks.

STATE OF THE ART

It is known practice in the context of protection against illicit copying of digital data from systems in which a digital content may be copied for use in a determined domain. Domain is intended to mean a set of installations belonging for example to one and the same domestic network, these installations sharing a secret specific to the domain, for example a cryptographic encryption key. An installation belonging to a domain may be a portable installation. Its membership of a particular domain will be determined by its knowledge of the secret specific to that particular domain.

The digital content of such a domain may be of three sorts:
"free copy": this type of content may be recorded and played back in any domain, so it is not necessary to know a secret specific to a domain to read this type of content;
"private copy": this type of content can be copied only for a particular domain in which it can be played back; the content is recorded in a form that requires the knowledge of the secret of the particular domain to be able to be played back. This type of content cannot be read on a device that does not belong to the particular domain;
"read only": this type of content may only be read in a particular domain but it cannot be copied; or, if copies of the content are made, they cannot be played back thereafter.

A digital content usually enters a domain through an access device or a source device. This type of device retrieves digital data through a channel external to the domain and broadcasts them to the other devices of the domain, for example by using a digital bus connecting the different installations of the domain. A source device may in particular be a digital decoder intended to receive video programs from outside a digital domestic network via a satellite antenna or a cable connection, in order to broadcast them in the network. It may also be an optical disk drive broadcasting in a domestic network (audio and/or video) data read on an optical disk (the disk in this case contains data originating from outside the network).

Inside the domain, the digital content may be recorded by digital recording devices such as a DVD ("Digital Versatile Disc") recorder or a hard disk.

Finally, the content is presented to the users of the domain by presentation devices. These devices are suitable for receiving the content of the domain (particularly the digital data circulating in a digital domestic network) in order to process it (particularly in order to decrypt it if necessary) and present it to the end user. This particularly involves television receivers used to view video data or hi-fi installations to listen to audio data.

A source device usually contains a module known as a "conditional access" module or a digital rights management module ("DRM") depending on whether the content is respectively a "broadcast content" or a "broadband content". These modules manage the protection of the content put in place by the content provider.

For example, considering pay television programs, the content provider, that is to say the program broadcaster, usually provides the digital programs in scrambled form (that is to say encrypted) using keys called control words, the control words themselves being transmitted with the data in encrypted form in messages called "ECM" ("Entitlement Control Message"). The content provider also provides the subscribers who have paid to receive the programs with the key by which to decrypt the control words and with a conditional access module containing, amongst other things, the algorithm for decrypting the control words (the key and the conditional access module are preferably included in a smart card). It is also the content provider who defines the rules of use of the content provided, that is to say who defines whether the content is of the "free copy", "private copy" or "read only" type.

In the system of protection against copying known by the name of SmartRight™ (SmartRight is a registered trademark of THOMSON multimedia), the source devices convert the received contents according to the rules of use of those contents.

When a content received by a source device of a given domain is of the "private copy" type, the content is converted in such a way that it can be decrypted only by presentation devices belonging to that particular domain (and therefore all sharing one and the same secret). The French patent application No. 01 05568, filed on Apr. 25, 2001 in the name of the applicant THOMSON Licensing S.A., concerning a symmetric key management method in a communication network, describes in particular how this conversion is carried out so that only the presentation devices knowing a secret key of the communication network are capable of decrypting the content to read it.

It will be noted that, in the rest of the description, the terms "secret key" or "symmetric key" will be used to designate a cryptographic key used in a symmetric encryption or decryption algorithm, such as the algorithm known by the name of AES (acronym for "Advanced Encryption Standard") or by the name of "Rijndael" and described in particular in the document entitled "*Proceedings from the first Advanced Encryption Standard Candidate Conference, National Institute of Standards and Technology (NIST)*, August 1998, J. Daemen and V. Rijmen".

When a content received by a source device is of the "read only" type, the content is also converted by this source device by using the method described in the abovementioned patent application such that it can be read only by the presentation devices of the network which know the network secret key. In addition, a method described in French patent application No. 00 15894, filed on Dec. 7, 2000 in the name of THOMSON multimedia, is implemented so that the content cannot be copied in the domain or, if copied, it cannot be played back by the presentation devices of the domain.

When a content received in a domain is of the "free copy" type, it is usually in clear and is left in that form by the source device which has received the content to broadcast it in the domain.

Thanks to this system, it is possible for a user, who receives a content after having paid the provider of that content the relevant fees, to keep a private copy of that content for his later personal use. This copy may be read only by the presentation devices of his domain, that is to say of the domain in which the content was initially received.

Nevertheless, there are situations in which it is desirable to be able to play back a private copy made in a first domain on a presentation device of a second domain. In particular, if a user wants to view on the domain of a friend the copy of a film made on his own domain, naturally without a copy being able to be made for the domain of the friend.

This may also be necessary in the event of union or of separation of users. In the case of union, if each user previously had his own domain, the two domains cannot be linked together because the installations of the two domains do not share the same secret. In this case, if the two users do not wish to manage two different domains, the content recorded previously on a first domain will have to be able to be played back on the second domain. Likewise, when there is a need to separate one domain into two different domains (because spouses are separating or a child leaves the home of its parents), the contents previously recorded on the common domain need to be able to be read on the two new domains.

The present invention aims to resolve the abovementioned problems.

DESCRIPTION OF THE INVENTION

Accordingly, the invention relates to a method of processing data, encrypted according to an encryption method specific to a first domain such that they cannot be decrypted without the aid of a first secret specific to said first domain, said data being received in a presentation device connected to a network belonging to a second domain. According to the invention, the method comprises the steps consisting, for the presentation device, in:

(a) transmitting to a processing device connected to the network at least a portion of said encrypted data;

(b) receiving from said processing device at least one element being used to decrypt said received data with the aid of a second secret specific to said second domain, said second secret being contained in the presentation device.

Thus the decryption of the data is delegated to a processing device which knows the first secret specific to the first domain and which performs a process on the portion of the data that it receives such that the presentation device of the second domain can decrypt the received data simply by knowing the second secret specific to the second domain.

In addition, since the secret of the first domain is not transmitted to the presentation device of the second domain, it can decrypt the received data only when the processing device is connected to the network of the second domain.

According to a particular embodiment of the invention, the data received in the presentation device are encrypted with the aid of a first symmetric key, said first symmetric key being received with said data in a form encrypted with the aid of the first secret. In this embodiment, step (a) consists in transmitting to the processing device the first symmetric key encrypted with the aid of the first secret; and step (b) consists in receiving from the processing device: the first symmetric key encrypted with the aid of a second symmetric key; and the second symmetric key encrypted with the aid of the second secret specific to the second domain.

According to a particular feature of the invention, the method also comprises the steps consisting, for the presentation device, in:

(c) decrypting, with the aid of the second secret, the second encrypted symmetric key;

(d) decrypting, with the aid of the second symmetric key, the first encrypted symmetric key; and (e) decrypting the data received by said presentation device with the aid of the first symmetric key.

According to a particular embodiment of the invention, the method also comprises, before step (a), a step consisting, for the presentation device, in generating a random number, the random number being transmitted to the processing device, in step (a), with the encryption of the first symmetric key. In this embodiment, the data received in step (b) contain a random number and the first symmetric key encrypted with the aid of the second symmetric key; step (d) also comprises the decryption, with the aid of the second symmetric, of the encrypted random number received in step (b); and the method also comprises, before step (e), a verification step to verify that the random number decrypted in step (d) is identical to the random number generated before step (a); step (e) being performed only in the event of positive verification.

According to another feature of the invention, a domain identifier is contained in the data received by the presentation device; the domain identifier is transmitted to the processing device during step (a); and step (b) is performed only if the processing device contains the same domain identifier.

BRIEF DESCRIPTION OF THE DRAWINGS

Other features and advantages of the invention will appear through the description of particular nonlimiting embodiments explained with the aid of the attached figures, in which.

DETAILED DESCRIPTION OF EMBODIMENTS OF THE INVENTION

Initially, in relation to FIG. 1, an example of domestic network will be described in which a system of protection against copying is implemented so that private copies of the digital content can be made for future use only in the domestic network in which it has been copied.

The network comprises a source device 1, a presentation device 2 and a recording device 3 connected together by a digital bus 4, which is for example a bus according to standard IEEE 1394.

The source device 1 comprises a digital decoder 10 furnished with a smart card reader fitted with a smart card 11. This decoder receives the digital data, particularly the audio/video programs distributed by a service provider.

The presentation device 2 comprises a digital television receiver (DTV) 20 furnished with a smart card reader fitted with a smart card 21 and the recording device 3 is in particular a digital video cassette recorder (DVCR).

The digital data that enters the network via the source device 1 are usually data scrambled by a content provider, for example according to the pay television principle. In this case, the data are scrambled with the aid of control words (CW) which are themselves transmitted in the data stream in a form encrypted with the aid of an encryption key $K_F$ while being contained in entitlement control messages (ECM). The encryption key $K_F$ is provided to users who have paid to receive the data, in particular being stored in a smart card. In the example in FIG. 1, the smart card 11 contains such a key $K_F$ and a conditional access CA module 14 capable of decrypting the control words CW.

The source device 1 which receives these scrambled digital data formats them so that they are broadcast over the digital network in a protection format specific to the domestic network. The decoder 10 comprises an "ECM unit" module 13 which extracts from the received data stream the ECM messages containing the control words encrypted with the aid of the key $K_F$ in order to transmit them to the CA module 14. The latter decrypts the control words CW and transmits them to a converter module 12 also contained in the smart card 11.

The role of the converter module 12 is to convert the information contained in the ECM messages into LECM ("Local Entitlement Control Message") messages protected with the aid of a secret key specific to the local domestic network, which will be called the key $K_{N1}$.

It is assumed that the converter module has previously randomly generated a symmetric key $K_C$ and has requested the encryption of that key $K_C$ with the aid of the network secret key $K_{N1}$. The converter module therefore has in memory the key $K_C$ and the key $K_C$ encrypted by the network secret key $K_{N1}$: $E\{K_{N1}\}(K_C)$.

In the rest of the description, the notation $E\{K\}(M)$ will always be used to signify encryption with a key K of the data M.

The abovementioned French patent application No. 01 05568 describes in detail the method which allows the converter module to obtain the encryption of the key $K_C$ with the aid of the network secret key $K_{N1}$, this encryption being carried out in a presentation device. Specifically, the presentation devices of the network, such as the device 2 in FIG. 1, are the only ones to have the network secret key $K_{N1}$. The latter is contained in the smart card 21 with a terminal module 22 responsible, amongst other things, for the operations of encryption and decryption with the network key $K_{N1}$.

The system operates as follows. When the digital data are received in the decoder 10, the "ECM unit" module 13 extracts the ECM messages containing the control words CW encrypted with the aid of the key $K_F$ specific to the content provider and provides them to the CA module 14. The latter decrypts the control words CW and transmits them to the converter module 12. In addition, the ECM message may also contain information concerning control of the copying of the transmitted content indicating whether or not the content may be freely copied in the network or whether the content may only be viewed (or listened to, etc.) in the network. This information is also transmitted to the converter module.

The converter module then constructs an LECM message based on these data. This message preferentially comprises:
- a portion A in clear containing in particular the information concerning control of the copying of the content, that is to say indicating whether the content is of the "free copy", "private copy" or "read only" type; this information is often denoted VCI ("Viewing Control Information"). The portion in clear also contains the key $K_C$ encrypted with the network key: $E\{K_{N1}\}(K_C)$.
- a portion B, encrypted with the key $K_C$, and containing essentially the decrypted control word CW; this portion can be summarized as: $E\{K_C\}(CW)$.
- an integrity field formed by the result of a hash function applied to all the portions A and B before encryption of the portion B. This integrity field is advantageously used to verify the validity of the LECM messages and to ensure that they are not illicitly modified.

The LECM message is then transmitted to the ECM unit which inserts it into the data stream in the place of the ECM messages. It should be noted that, when the received content is not already in scrambled form as described above and does not contain any ECM message, the converter module 12 is responsible in this case for putting the data in this form so that the data stream broadcast over the network 4 is always in data packet form like the packet 40 represented in FIG. 1 containing an LECM message and scrambled data.

The content of this packet can be summarized as follows:
LECM|E\{CW\}(<data>); or:
$E\{K_{N1}\}(K_C)$|VCI|$E\{K_C\}(CW)$|Integrity field|$E\{CW\}$(<data>);

where "|" represents the concatenation operator.

When these data packets are received by the digital television receiver 20, they are transmitted to the "LECM unit" module 23 which extracts from them the LECM messages in order to transmit them to the terminal module 22. The latter first decrypts $E\{K_{N1}\}(K_C)$ with the aid of the key $K_{N1}$ to obtain the key $K_C$. Then, with the aid of the key $K_C$, it decrypts $E\{K_C\}(CW)$ to obtain the control word CW which it transmits to the "LECM unit" module 23. The latter is then able to descramble the data $E\{CW\}$(<data>) with the aid of the control word. The unscrambled data are then presented to the user. In the case of video data, the data may be viewed on the television receiver 20.

If the data stream containing the packets 40 is recorded by the digital video cassette recorder 3 to be played back later, it is noted that this is not possible unless the presentation device on which the data are to be presented contains the secret key $K_{N1}$ of the domain in which the data were recorded. In what follows, this domain will be called N1.

Figure 1:
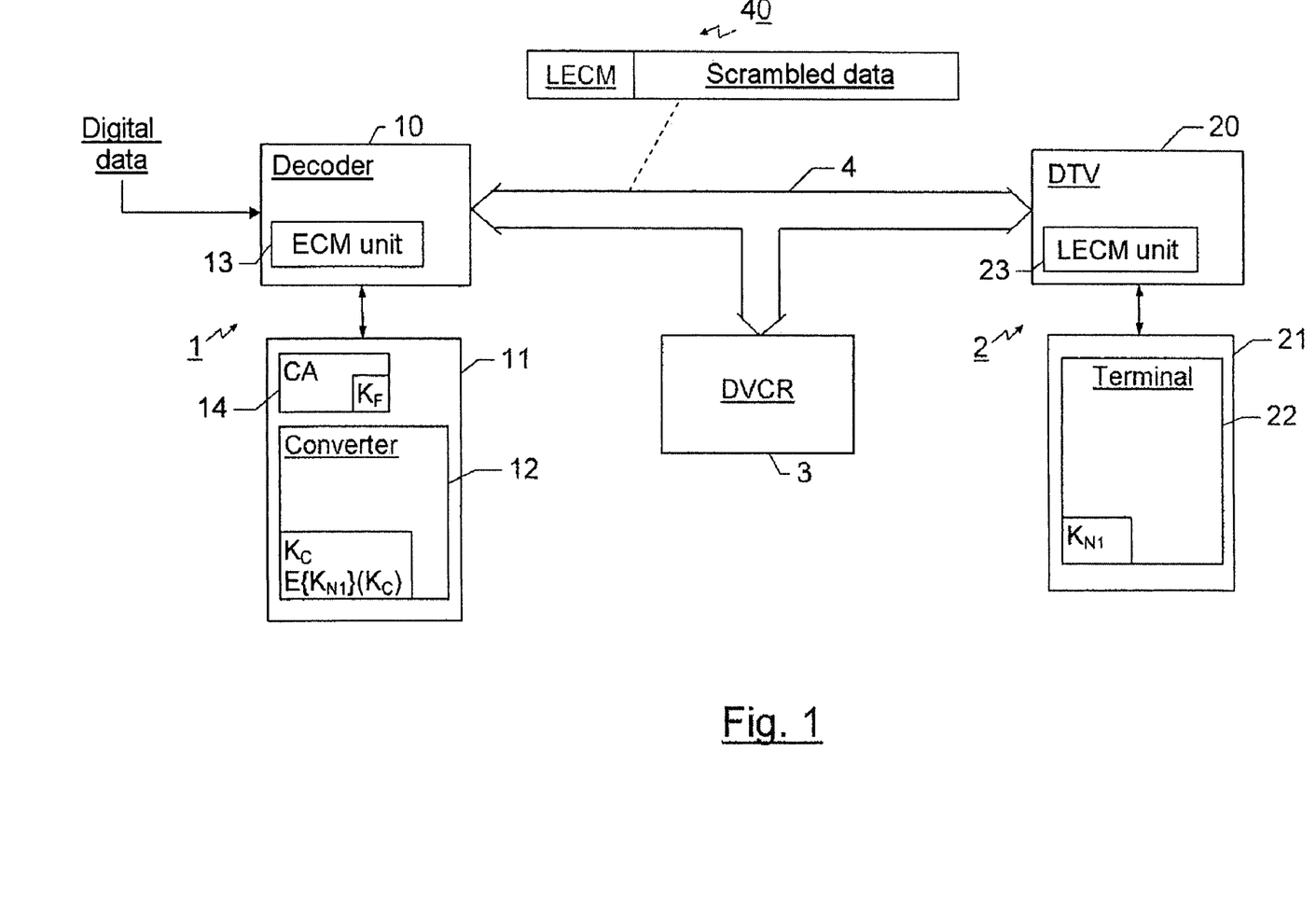
FIG. 1 is a block diagram of a digital domestic network interconnecting devices belonging to a first domain.

Remember that, in the example in FIG. 1, the domain is the digital domestic network and all the installations connected to it and also portable presentation installations (not shown) which are likely to be connected to the domestic network and which belong to the members of the family owning the domestic network. The portable presentation installations (for example compressed music file readers) are considered to form part of the domain N1 when they contain the secret key $K_{N1}$. Refer to the abovementioned French patent application No. 01 05568 for a description of how the secret key of the domain N1 is transmitted to the new presentation devices which "enter" the domain (for example when a member of the family buys a new installation).

Now suppose that a user, having recorded a content (for example a film) of the "private copy" type on his domain N1, wants to be able to view it on a television receiver belonging to another domain which will be called N2.

In this case, the user inserts for example a cassette containing the film into a digital video cassette recorder of the domain N2. This video cassette recorder will broadcast the film over the domestic network of the domain N2 so that it is viewed on a television receiver of the domain N2. But since the latter does not know the secret key of the domain N1, $K_{N1}$, it will not be able to decrypt the content of the LECM messages and therefore will not be able to descramble the data to present the film to the user.

There follows a description of how, thanks to the invention, it will be possible to view in the domain N2 the content recorded as "private copy" in the domain N1 without, however, it being possible to make a copy of that content for the domain N2, or at least such that, if a copy is made in the domain N2, this copy cannot be played back in the domain N2.

For this, a special module is provided combining the functionalities of a converter module and a terminal module and preferentially included in a smart card. This will be referred to hereafter as either the terminal/converter module or the terminal/converter card.

This module will first have to be initialized in the domain N1 to receive the secret of the domain N1, that is the key $K_{N1}$, then it will be connected to the domain N2 to perform the decryption of the encrypted portions with the key $K_{N1}$ of the data packets forming the content.

Greater detail will now be given of how these steps are performed.

Figure 2:
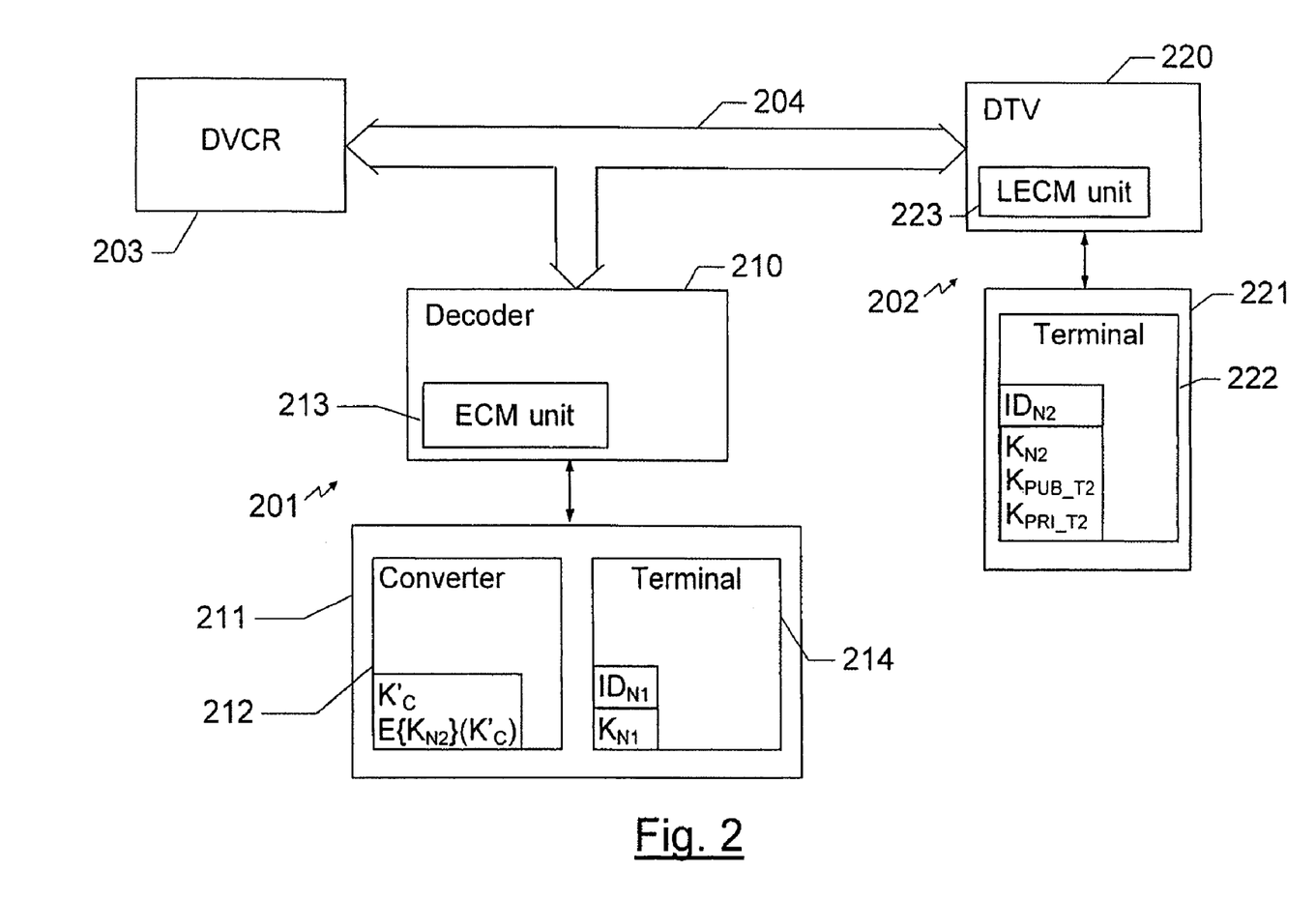
FIG. 2 is a block diagram of a domestic network comprising devices belonging to a second domain illustrating one embodiment of the invention.

FIG. 2 represents schematically the digital domestic network of a domain N2 in which the preferred embodiment of the invention is implemented. Only the elements necessary to the comprehension of the invention are shown.

In this network, a digital bus 204 interconnects a digital video cassette recorder 203, a presentation device 202 and a source device 201. The digital bus 204 is preferentially a bus according to the standard IEEE 1394. The presentation device 202 comprises a digital television receiver DTV 220 which comprises an "LECM unit" module 223 and a smart card 221 comprising a terminal module 222. The secret key of the domain N2: $K_{N2}$, is stored in the smart card 221.

The source device 201 comprises a digital decoder 210 which comprises an "ECM unit" module 213. Into the decoder 210 is inserted a terminal/converter card 211 which comprises a terminal module 214 and a converter module 212. This card 211 is inserted in the place of a "converter" card, that is to say of a smart card containing a converter module such as the card 11 in FIG. 1, into the source device 201.

In practice, the terminal/converter card 211 belongs to the user of the domain N1 and the latter inserts it into a source device (or into a presentation device as will be seen in a second embodiment) of the domain N2 when he wants to view in the domain N2 a content recorded as "private copy" in the domain N1.

The terminal module 214 contains the secret key of the domain N1 which it received during an initialization phase of the terminal/converter card 211 in the domain N1.

Specifically, before being connected to the network of the domain N2, the terminal/converter card 211 was first connected to the network of the domain N1 by being inserted into a presentation device of N1 instead of the "terminal" card (a smart card containing a terminal module like the card 21 in FIG. 1) that is usually there. The terminal module 214 was then considered "virgin", that is to say not belonging to any domain.

The terminal module 214 then received from the "originator" device of the domain N1 the secret key KN, before becoming "sterile".

The terms "virgin", "originator" and "sterile" are defined in the aforementioned French patent application No. 01 05568 and designate respectively a presentation device (or more precisely its terminal module):
- which is not connected to any domain and contains no domain secret key ("virgin" terminal module or device);
- which has the secret key of a domain and can transmit it to a new virgin presentation device likely to be connected to the domain ("originator" terminal module or device); and
- which has the secret key of a domain but cannot transmit it to another device ("sterile" terminal module or device).

The aforementioned patent application also describes the mechanisms for secure transmission of the secret key between the different devices.

After this initialization phase in the domain N1, the terminal/converter card 211 is then connected to a domain N2 in which it is desired to view a content recorded as "private copy" in the domain N1. In FIG. 2, it is inserted into the digital decoder 210 of the source device 201.

Figure 3:
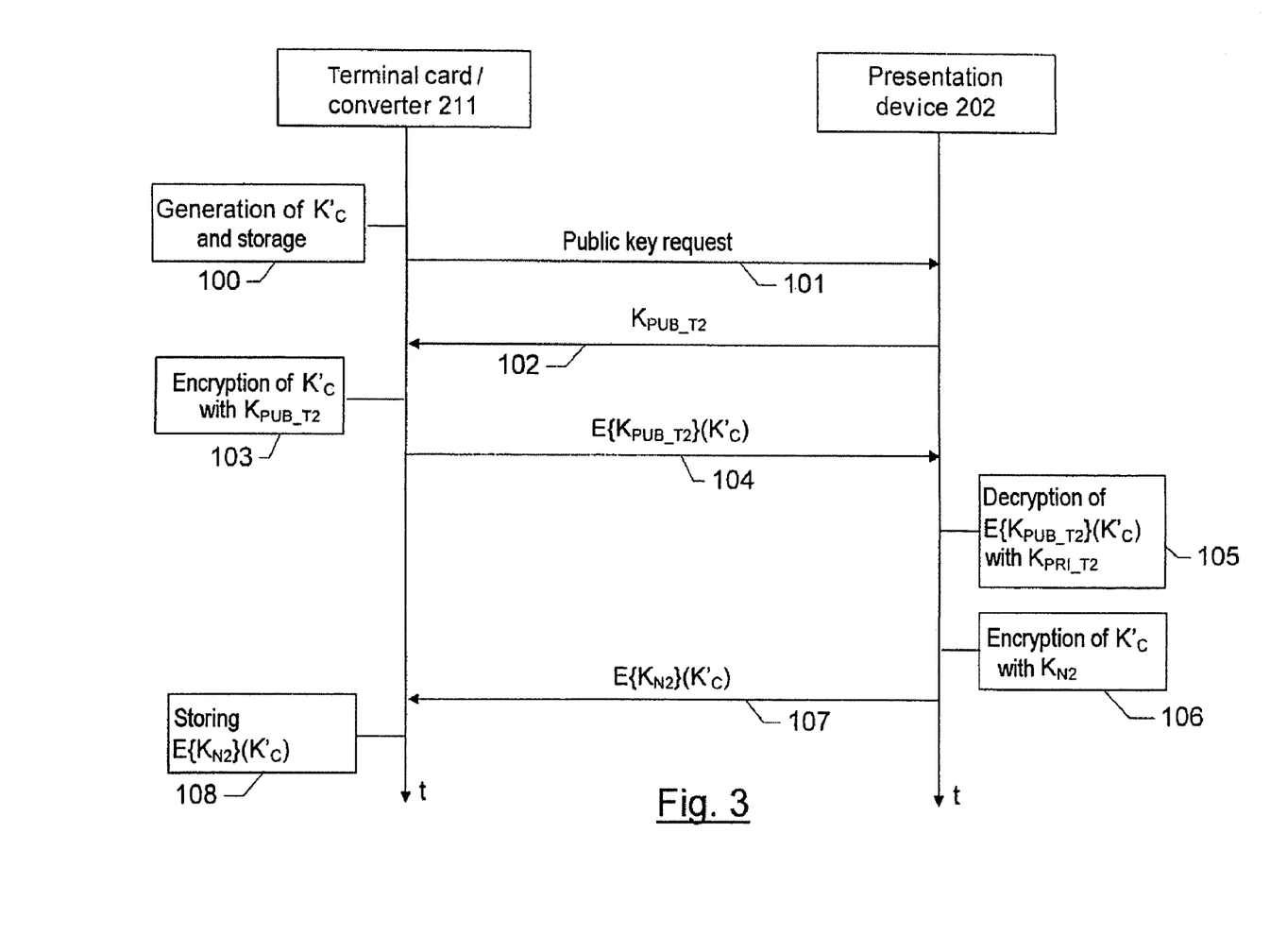
FIG. 3 is a timing diagram illustrating exchanges of keys between two devices in the domestic network in FIG. 2.

FIG. 3 illustrates the steps that are carried out after the terminal/converter card 211 has been connected to the network of the domain N2.

During a first step 100, a symmetric key $K'_C$ is generated randomly by the converter module 212 of the terminal/converter card 211 and is stored in the card 211.

During the next step 101, the source device 201 broadcasts a request message over the network of the domain N2 to receive a public key of a presentation device on the network. Each presentation device has in effect a pair of asymmetric keys stored in the smart card which contains the terminal module. For example, the presentation device 202 in FIG. 2 has a public key $K_{PUB\_T2}$ and a private key $K_{PRI\_T2}$. These keys are used in a manner known per se to carry out encryption or decryption operations with the aid of asymmetric cryptographic algorithms (for example the RSA algorithm, from the name of its creators Rivest, Shamir and Adleman).

Any presentation device of the domain N2 may respond to this request 101. It is assumed in what follows that the presentation device 202 responds to the request by sending its public key $K_{PUB\_T2}$ to the source device 201 in step 102.

The converter module 212 then carries out the encryption of the symmetric key $K'_C$ with the aid of the public key $K_{PUB\_T2}$ received (step 103), then it sends the result of this encryption $E\{K_{PUB\_T2}\}(K'_C)$ to the presentation device 202 (step 104). The latter decrypts the received result with the aid of its private key $K_{PRI\_T2}$ to obtain $K'_C$ (step 105). It then proceeds (step 106) with the encryption of $K'_C$ with the secret key of the domain N2, $K_{N2}$, to obtain $E\{K_{N2}\}(K'_C)$, which is the result that it sends to the source device 201 in step 107. This result $E\{K_{N2}\}(K'_C)$ is stored in the terminal/converter card 211 in the next step 108.

The terminal/converter card is now ready to carry out the decryption of the "private copy" content of the domain N1 for the domain N2.

Figure 4:
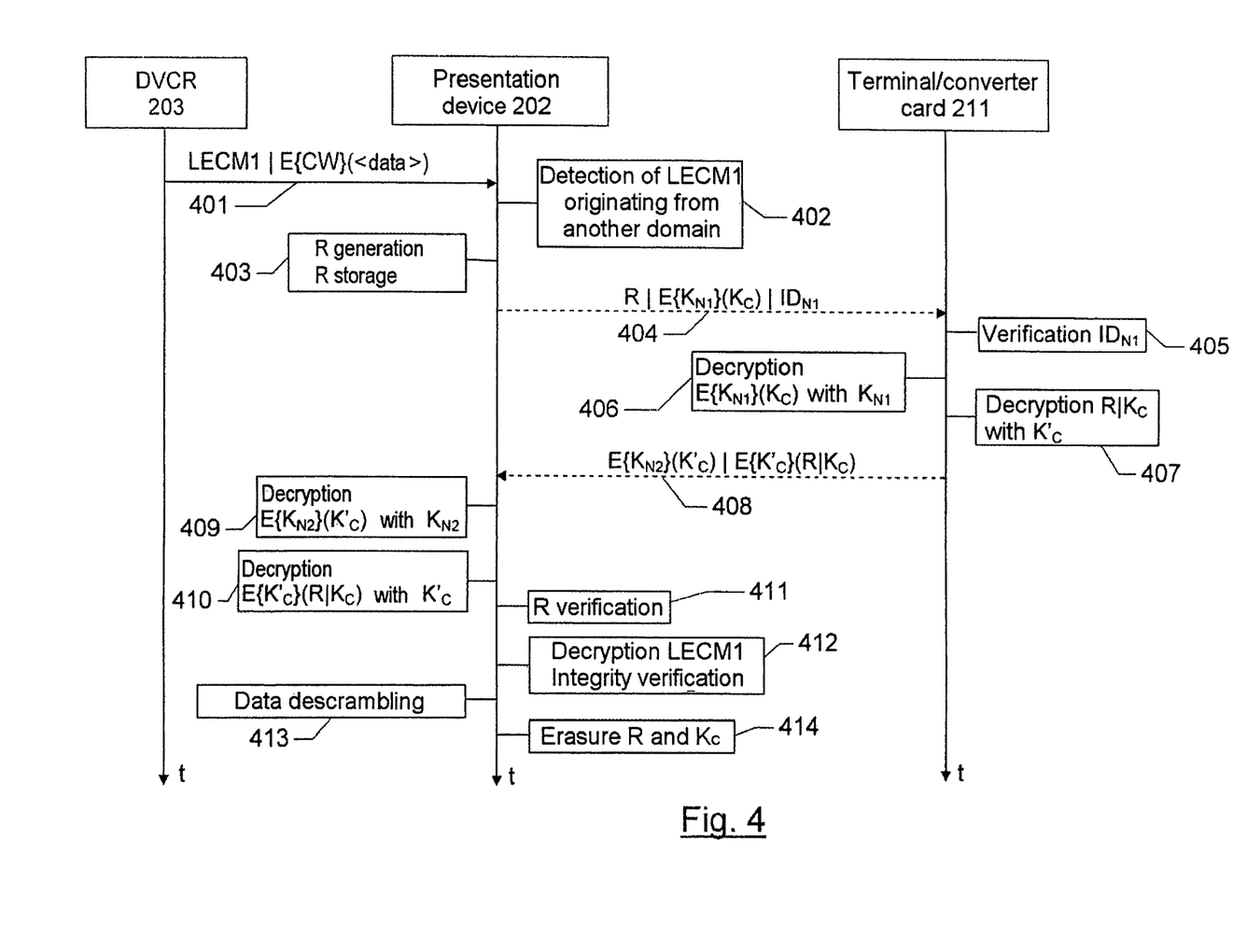
FIG. 4 is a timing diagram illustrating the exchanges of data between devices on the domestic network in FIG. 2 that can be used to read (without copying) in the second domain a content recorded in the first domain.

There now follows a description, with reference to FIG. 4, of the process used for this.

FIG. 4 uses three downward vertical axes t to represent the time axis to illustrate the processes performed by the digital video cassette recorder DVCR 203, the presentation device 202 and the terminal/converter card 211 and the exchanges between these elements when a new content originating from the domain N1 is broadcast over the digital domestic network of the domain N2.

Initially, the user inserts for example the video cassette containing the video program recorded in the domain N1 into the digital video cassette recorder 203 of the domain N2. The video cassette recorder broadcasts the data recorded on the cassette in conventional manner over the network of the domain N2.

It is assumed that the user wants to view the content on the presentation device 202. He therefore sets this device to the broadcast channel of the digital video cassette recorder 203 to receive the data.

These data broadcast in step 401 in FIG. 4 contain data packets like the following packet:

LECM1|E{CW}(<data>), or

E{$K_{N1}$}($K_C$)|E{$K_C$}(CW)|Integrity field|E{CW}(<data>), where the Integrity field is computed as follows:

Hash (E{$K_{N1}$}($K_C$)|CW), where "Hash (x)" represents a hash function, that is to say a mathematical function which converts an input data set "x" into a data set "y" of fixed size, often smaller than the input data size, and representative of the input data; this function is also a one way function, that is to say that, knowing "y" it is impossible to find "x" again, such as y=Hash(x). Preferentially, the SHA-1 function described in document "*Secure Hash Standard, FIPS PUB* 180-1, *National Institute of Standard Technology*, 1995" is used.

When such a data packet is received in the presentation device 202, the "LECM unit" module 223 extracts the LECM1 message from the data packet and transmits it to the terminal module 222.

The latter will first detect, in step 402, that this LECM1 message originates from a domain different from the domain N2.

For this, according to a first preferred variant of embodiment, the LECM1 message also contains in its portion in clear, that is to say in its portion that has not been encrypted by the key $K_C$, a domain identifier $ID_{N1}$. This identifier identifies the domain N1 in unique manner and is for example the result of a hash function applied to the secret key of the domain N1, $K_{N1}$. The identifier $ID_{N1}$ is contained in any terminal card of a presentation device of the domain N1. It is also contained in this case in the terminal/converter card 211.

The terminal card 221 of the presentation device 202 also contains, in addition to the secret key of the domain N2, an identifier of the domain N2: $ID_{N2}$. The terminal module 222 therefore compares the identifier $ID_{N1}$ contained in the LECM1 message with the identifier contained in the terminal/converter card $ID_{N2}$. When the two identifiers are different, the terminal module 222 deduces from them that the received LECM1 message originates from a domain different from the domain N2.

According to a second variant of embodiment, the LECM1 message contains no domain identifier. The terminal module 222 in this case will use the Integrity field of the LECM1 message to verify whether or not this message originates from the domain N2.

Specifically, if the terminal module 222 decrypts the LECM1 message with the key $K_{N2}$ and applies the aforementioned hash function "Hash(x)" to the decrypted data, the result obtained will be different from the Integrity field of the LECM1 message and the terminal module will deduce from this that the LECM1 message originates from a domain different from N2.

In the next step 403, the terminal module 222 generates a random number R. This number is preferentially generated by a pseudo-random number generator well known per se. The number R is a challenge used to prevent "replay attacks" (attacks consisting in replaying recorded messages). The number R is temporarily stored in step 403 in a secure memory zone of the card 221.

The presentation device 202 then broadcasts over the network, in step 404, a message containing the following data:

R|E{$K_{N1}$}($K_C$)|$ID_{N1}$

The identifier $ID_{N1}$ is included in this message only in the first variant of embodiment described above.

This broadcast is made using the asynchronous channel of the bus 204 by which the command messages usually travel (the transmission via the asynchronous channel of the bus 204 is represented by a dashed arrow in FIG. 4).

The source device 201 which receives this message transmits it to the terminal/converter card 211.

The next step 405 takes place only in the context of the aforementioned first variant of embodiment and consists in verifying that the identifier included in the message received in step 404 is identical to the one contained in the terminal/converter card 211. If the two identifiers are not identical, then the process stops because the terminal/converter card 211 is not capable of decrypting the information E{$K_{N1}$}($K_C$). If the identifiers are identical, however, the process continues with step 406 during which the terminal/converter card decrypts E{$K_{N1}$}($K_C$) with the aid of the key $K_{N1}$ to obtain the key $K_C$.

In the case where the second variant of embodiment is used, step 405 does not occur and any terminal/converter card connected to the network of the domain N2 will perform step 406 and the subsequent ones 407 and 408.

In step 407, the terminal/converter card encrypts the data R and $K_C$ with the key $K'_C$ and then it constructs the following message:

E{$K_{N2}$}($K'_C$)|E{$K'_C$}(R|$K_C$)

which it transmits to the presentation device 202, still via the asynchronous channel of the bus 204, in step 408.

In step 409, the terminal module 222 decrypts E{$K_{N2}$}($K'_C$) with the key $K_{N2}$ to obtain the key $K'_C$ with which it decrypts E{$K'_C$}(R|$K_C$) to obtain R|$K_C$ in the next step 410.

Then, in step 411, the terminal module 222 verifies that the number R found in step 410 is indeed the same as that which was generated and stored in step 403. If this is not the case, the process stops because this means that the message received in step 408 is not valid.

If the verification is positive, the process continues, in step 412, with the decryption of the LECM1 message with the aid of the key $K_C$ obtained in step 410. More precisely, the information E{$K_C$}(CW) is decrypted to obtain the control word CW in clear.

In step 412 the terminal module 222 also verifies the integrity of the LECM1 message by computing:

Hash (E{$K_{N1}$}($K_C$)|CW) based on the data decrypted above and comparing this result with the Integrity field of the LECM1 message.

When the second variant of embodiment mentioned above is implemented, the presentation device 202 may where necessary receive several messages of the type sent in step 408 if several terminal/converter cards are connected to the network of the domain N2. In this case, the terminal module 222 performs the steps 409 to 412 for each message received in step 408 and, when the verification of the integrity of the LECM1 message is correct, the terminal module deduces from it that the message received in step 408 is the one originating from the terminal/converter card of the domain N1.

If the integrity verification fails in all cases, then the process is stopped. Provision can be made in this case to present a warning message intended for the user.

Otherwise, the terminal module 222 transmits the decrypted control word to the "LECM unit" module of the television receiver 220 and the latter can thus descramble, in step 413, the data of the data packet received in step 401.

The presentation device 202 is also capable, thanks to the key $K_C$ that it temporarily stores, of decrypting the subsequent data packets of the content broadcast by the digital video cassette recorder 203 while the LECM1 messages of these packets are protected by the same key $K_C$. If ever the key $K_C$ changes, then the steps 403 to 412 are repeated so that the presentation device 202 receives the new key $K_C$ from the terminal/converter card 211.

Then, when all the data packets forming the content have been received and decrypted by the presentation device 202, the latter erases from its memory in step 414 the number R and the key $K_C$ that it had temporarily stored to make the above computations.

FIG. 2 illustrates an embodiment in which the terminal/converter card 211 is inserted into a source device of the domain N2, instead of the converter card which is normally there.

But it is also possible, in a second embodiment, to insert the terminal/converter card into a presentation device of the domain N2, instead of the terminal card that is normally there. The process operates in the same manner as has been described with reference to FIGS. 3 and 4. However, in this case, the domain N2 must naturally comprise at least two presentation devices so that at least one of the devices can retain its terminal card containing the domain key $K_{N2}$ in order to apply the steps that are illustrated in FIGS. 3 and 4.

The invention is not limited to the exemplary embodiments that have just been described. In particular, it applies equally to digital domestic networks in which the data (particularly the LECM messages) are protected with the aid of a pair of asymmetric keys specific to the domain to which the network belongs, the public key of the network being contained in the source devices in order to encrypt the data and the private key being contained in the presentation devices in order to decrypt the data. In this case, after the initialization phase, the terminal/converter card must contain the private key of the first domain N1 and the public key of the second domain N2 to be capable of decrypting the data encrypted for the first domain and to re-encrypt them so that they can be decrypted by a presentation device of the second domain.

Likewise, the invention also applies in another particular case in which the digital data, protected by a conditional access system of a content provider, are received in a given domain N2 and are directly recorded in a recording device of the domain N2 without first having been "converted" by a converter module of the domain N2 to be played back in the domain N2. When these recorded data are later received by a presentation device of the domain N2 to be presented to a user, this presentation device is not capable of decrypting the ECMs containing the control words CW protected by a secret specific to the content provider (typically, the key $K_F$ appearing in FIG. 1 in the CA module 14). In this case it is considered that the "first domain" in the sense of the present invention is that of the content provider. The presentation device then broadcasts the ECM messages over the network of the domain N2 so that they are converted by a converter module of the domain N2 (associated with a conditional access module of the content provider) into LECM messages that can be decrypted with the aid of the secret of the domain N2.

The invention claimed is:

1. A method of processing data encrypted according to an encryption method specific to a first domain such that the data cannot be decrypted without using a first secret specific to said first domain, said data being received in a presentation device connected to a network belonging to a second domain, the method comprising:
   (a) transmitting at least a portion of said encrypted data to a processing device connected to the network;
   (b) receiving, in said presentation device, processed data from said processing device, at least one element of said processed data being used by said presentation device to decrypt said received data using a second secret specific to said second domain, said second secret being contained in the presentation device, said second secret specific to said second domain being different from said first secret specific to said first domain; wherein
   the data received in the presentation device are encrypted using a first symmetric key, said first symmetric key being received with said data in a form encrypted using the first secret;
   step (a) comprises transmitting to the processing device the first symmetric key encrypted using the first secret; and
   step (b) comprises receiving from the processing device:
      said first symmetric key encrypted using a second symmetric key; and
      the second symmetric key encrypted using the second secret specific to the second domain; the method further comprising:
   (c) decrypting, using the second secret, the second encrypted symmetric key;
   (d) decrypting, using the second symmetric key, the first encrypted symmetric key; and
   (e) decrypting the data received by said presentation device using the first symmetric key.

2. The method as claimed in claim 1, comprising, before step (a), generating a random number,
   said random number being transmitted to the processing device, in step (a), with the encryption of the first symmetric key;
   wherein the data received in step (b) contain a random number and the first symmetric key encrypted using the second symmetric key;
   step (d) also comprising the decryption, using the second symmetric key, of an encrypted random number received in step (b); and
   further comprising, before step (e), verifying that the random number decrypted in step (d) is identical to the random number generated before step (a).

3. The method as claimed in claim 1, wherein a domain identifier is contained in the data received by the presentation device and
   further wherein said domain identifier is transmitted to the processing device during step (a).

4. The method as claimed in claim 1 further comprising initially applying a hash function to said portion of encrypted data and said portion of data transmitted in the clear prior to encryption of said portion of encrypted data.

5. The method as claimed in claim 1 wherein said second domain comprises a local domestic network of presentation devices.

* * * * *